(12) United States Patent
Wright et al.

(10) Patent No.: US 7,556,052 B2
(45) Date of Patent: Jul. 7, 2009

(54) PORTABLE TREE MOUNTED HUNTING BLIND

(75) Inventors: Clifton P. Wright, King, NC (US);
Holly L. Huelskamp, King, NC (US);
William M. Reavis, King, NC (US)

(73) Assignees: Paul Wright, King, NC (US); Holly Huelskamp, King, NC (US)

( * ) Notice: Subject to any disclaimer, the term of this patent is extended or adjusted under 35 U.S.C. 154(b) by 28 days.

(21) Appl. No.: 11/755,261

(22) Filed: May 30, 2007

(65) Prior Publication Data
US 2008/0295877 A1 Dec. 4, 2008

(51) Int. Cl.
*E04H 15/04* (2006.01)

(52) U.S. Cl. .......................... 135/90; 135/96; 135/117; 135/901; 182/136; 182/187; 248/219.4; 248/217.3; 43/1

(58) Field of Classification Search .......... 135/90, 135/96, 901, 127, 130, 117; 182/187, 116, 182/135, 136, 92; 43/1; 248/230.8–230.9, 248/219.4, 217.3
See application file for complete search history.

(56) References Cited

U.S. PATENT DOCUMENTS

| | | | |
|---|---|---|---|
| 3,116,808 A * | 1/1964 | Riley | 182/129 |
| 3,358,789 A * | 12/1967 | Laun | 182/113 |
| 3,545,461 A | 12/1970 | Carlson | |
| 3,609,905 A | 10/1971 | Fuhrman et al. | |
| 4,134,474 A * | 1/1979 | Stavenau et al. | 182/187 |
| 4,505,286 A | 3/1985 | Madion | |
| 4,773,437 A | 9/1988 | Glutting | |
| 4,805,655 A | 2/1989 | Justice | |
| 4,951,696 A * | 8/1990 | Jones, Sr. | 135/90 |
| 5,507,362 A * | 4/1996 | Krueger | 182/3 |
| 5,630,439 A | 5/1997 | Hutto | |
| 5,669,403 A * | 9/1997 | Belcher et al. | 135/90 |
| 5,803,694 A | 9/1998 | Steele | |
| 5,845,743 A * | 12/1998 | Dechant | 182/187 |
| 6,148,836 A * | 11/2000 | Cananzey | 135/87 |
| 6,202,665 B1 | 3/2001 | O'Hare | |
| 6,243,979 B1 | 6/2001 | Seats et al. | |
| 6,431,192 B2 | 8/2002 | O'Hare | |
| 6,434,877 B1 | 8/2002 | Shelton | |
| 6,499,496 B1 * | 12/2002 | Young | 135/90 |
| 6,510,922 B1 | 1/2003 | Hodnett | |
| 6,539,966 B2 | 4/2003 | Raines, Jr. et al. | |
| 6,588,440 B2 | 7/2003 | Varnado | |
| 6,769,442 B2 | 8/2004 | Johnson | |
| 6,942,065 B1 | 9/2005 | Price | |
| 7,100,626 B2 * | 9/2006 | Livacich | 135/90 |
| 7,182,091 B2 * | 2/2007 | Maddox | 135/90 |
| 7,222,634 B2 * | 5/2007 | Hess et al. | 135/93 |
| 2002/0036007 A1 | 3/2002 | Sellers | |
| 2002/0078988 A1 | 6/2002 | Valpredo | |
| 2003/0024559 A1 | 2/2003 | Fields | |

* cited by examiner

*Primary Examiner*—Winnie Yip
(74) *Attorney, Agent, or Firm*—Womble Carlyle Sandridge & Rice, PLLC; C. Robert Rhodes (57) ABSTRACT

A tree mounted blind that includes a plurality of articulated arcuate arm members forming a suspension frame which is attached at each end to a mounting bracket, which in turn is affixed to a tree trunk without any cords, cables, or bands surrounding the tree. A fabric blind is hung from the framework to provide a hunting blind, a military blind for observers and the like, or a privacy blind for campers and the like.

9 Claims, 8 Drawing Sheets

PORTABLE TREE MOUNTED HUNTING BLIND

FIELD OF THE INVENTION

The present invention relates generally to hunting blinds, concealment curtains, and the like.

BACKGROUND OF THE INVENTION

Over the years, various configurations of hunting blinds have developed. Such blinds are conventionally used either on the ground or with tree stands. Generally, these blinds are attached in some manner to a selected tree and provide some type of frame work to which a camouflage curtain is attached to prevent detection by the wildlife being hunted.

To date, such blinds still are not totally satisfactory. Some are difficult or noisy to install, particularly if used with an elevated tree stand where access from the ground is unavailable. Some are not easily foldable or compact, and are not easy to carry from place to place. Some are not sturdy. Typical examples are shown in U.S. Pat. Nos. 5,669,403; 6,243,979; and 6,434,877.

SUMMARY OF THE INVENTION

In accordance with the foregoing discussion, a portable tree-mounted blind that addresses shortcomings in previous configurations is disclosed. Toward this end, one aspect of the invention includes a pair of mounting brackets provided for attachment directly to the trunk of a selected tree by one or more securing members that extend through the brackets and into the tree. The bracket also includes a frame mounting member extending from the face thereof. A collapsible, arcuate shaped suspension frame includes an end member at each end that is releasably connectable to the frame mounting member of one of the brackets. The arcuate shaped frame further includes a plurality of arcuately shaped arms foldably connected together.

According to another aspect, when folded, the arms and end members of the frame collapse into a compact configuration with generally the dimensions of one of the arms. However, when unfolded and assembled to the brackets, the frame is sturdy and substantial. A camouflage curtain is suspended from the frame to conceal the user (hunter, camper, military person, and the like).

In a preferred embodiment, the bracket is a flat plate and includes a securing member extending through an opening in the upper portion. The securing member is threaded on one end and includes a bolt type head on the other. A crank with an extended crank handle is provided which engages the head for facilitating emplacement of the bracket.

In a further preferred embodiment, the frame mounting member is pivotally attached to the face of the mounting bracket by a connecting arm that allows the frame with the curtain attached, to be raised and lowered permitting easier access and egress.

Such a configuration is lightweight, easy and quick to install, and adjusts to substantially any size of tree. It is compact when folded, making it easy to transport. The blind can be used on the ground or with a tree stand (as illustrated), and does not require the user to reach around the tree to install. Assuming the owner has several sets of brackets, the brackets can be pre-installed at a variety of favorite hunting sites. Then the framework can be moved from site to site, while the brackets remain emplaced.

When certain embodiments are used, the frame can be installed onto the brackets quickly with no tools and very little noise. It can be reinforced by use of a cable extending through the arms. The blind can be used with many types of game (deer, turkey, duck, etc.) and has other end uses than hunting. For example, it can be used as the wall of a dressing room or bathroom for campers, or can be used by the military to conceal personnel for various reasons.

BRIEF DESCRIPTION OF THE DRAWINGS

The foregoing and other features of the invention will be readily understood and fully appreciated by reading the following detailed description, along with accompanying drawings in which.

DETAILED DESCRIPTION OF THE PREFERRED EMBODIMENT

Figure 1:
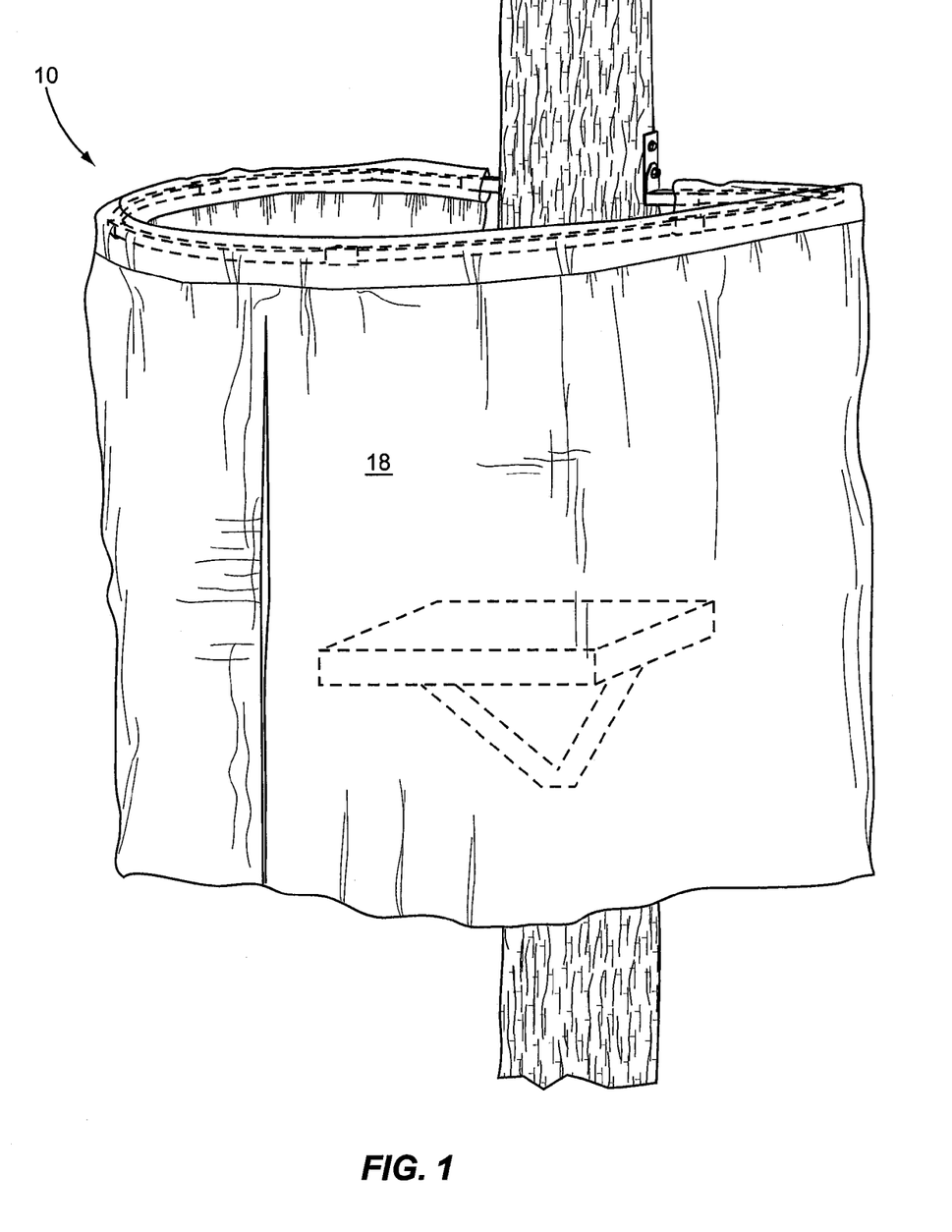
FIG. 1. is a perspective view of the blind of the present invention mounted on a tree ready for use.
Figure 2:
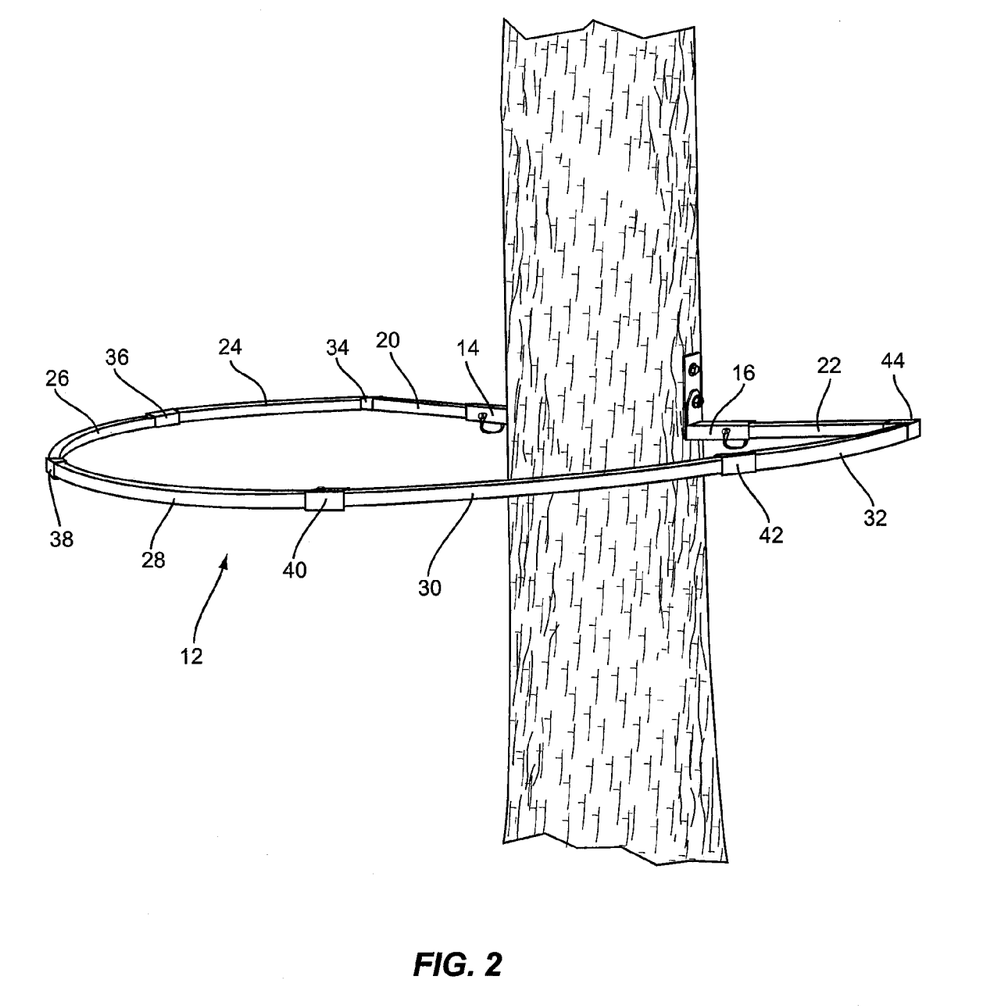
FIG. 2. is a view similar to FIG. 1, except illustrating the frame without the curtain.
Figure 3:
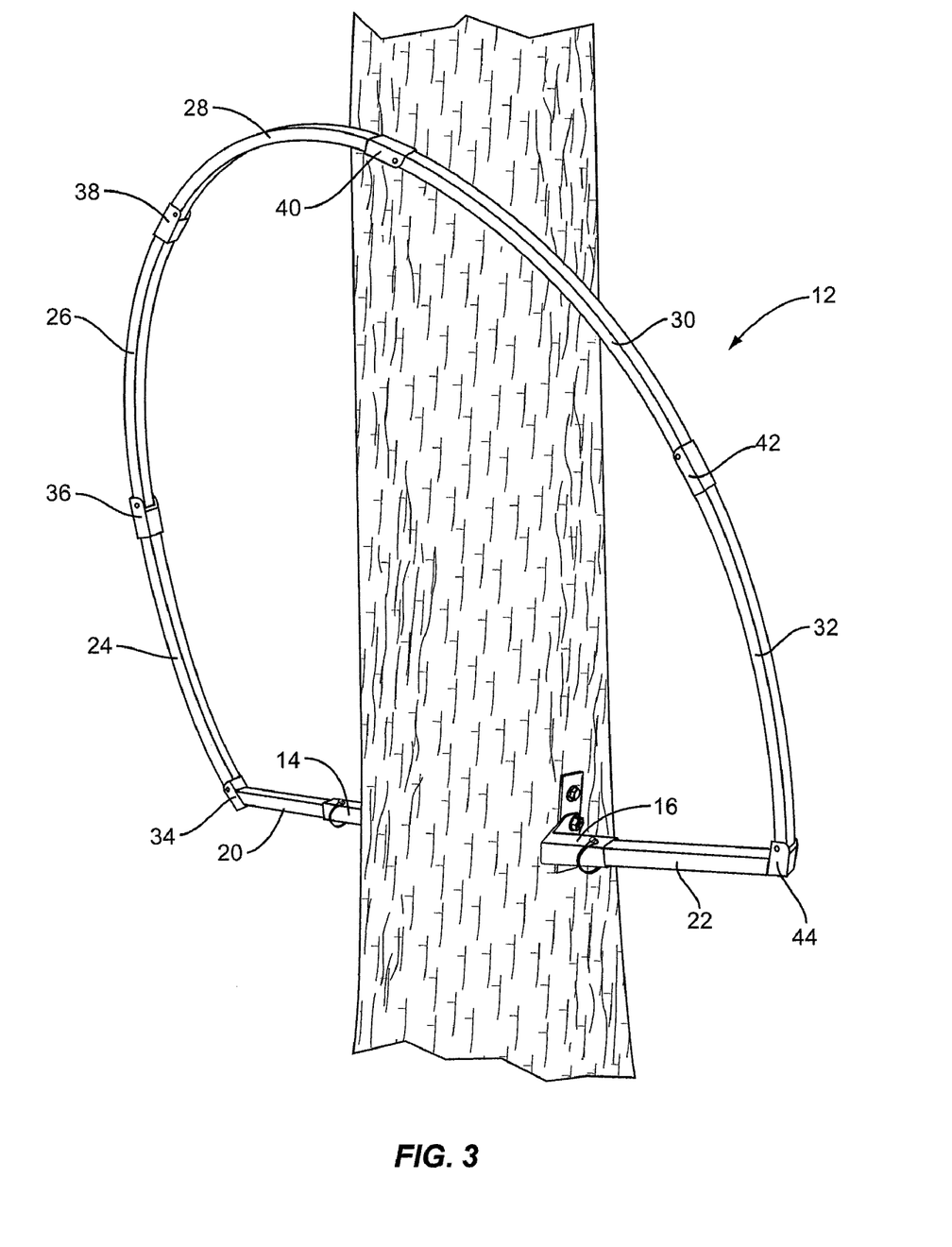
FIG. 3. is a view similar to FIG. 2, except showing the frame lifted for access in accordance with one aspect of the invention.

The following is a description of a preferred embodiment of the invention. Turning now initially to FIGS. 1-3 there is illustrated the portable tree mounted hunting blind 10 which generally includes an articulated, arcuate shaped frame 12 secured to an appropriate tree by a pair of mounting brackets 14, 16. A fabric curtain 18 is suspended from the frame 12 in an appropriate manner. As illustrated, the fabric curtain 18 includes a hem at the upper end thereof, which is threaded onto the articulated frame 12 prior to its installation onto the brackets 14, 16.

As illustrated in FIGS. 2 and 3, the frame may be positioned in such a manner as to be generally horizontal, which is the operative or usable position. In order to enter or leave the blind, the frame may be lifted upwardly as illustrated in FIG. 3 to facilitate access and egress to the hunter's position. As is well known, such blinds may be used with a tree stand as illustrated in FIG. 1, or they may be situated nearer to the ground, so that the hunter or person using the blind may stand or sit, as on a camp stool.

Figure 4:
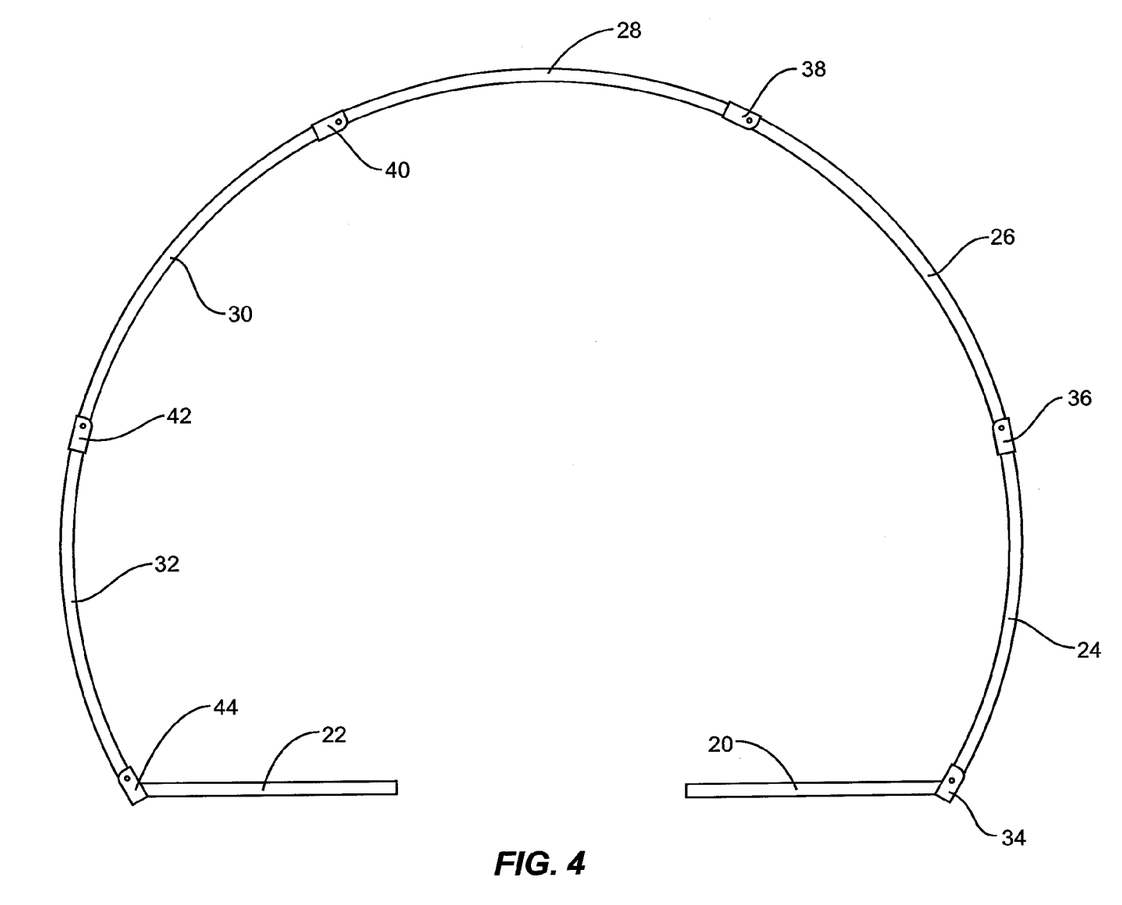
FIG. 4. is a perspective view of the frame alone in the unfolded, extended position, but not connected to the mounting brackets.

As illustrated best in FIGS. 2-4, the articulated frame 12 includes a pair of end members 20, 22, and a plurality of arcuate shaped arm members (sometimes referred to as "arms" 24, 26, 28, 30, and 32). The arms 24-32 in the illustrated embodiment are generally rectangular and tubular, preferably formed of a lightweight steel or aluminum. The arms are connected by hinge members 34, 36, 38, 40, 42, and 44. A better showing of hinges 34-44 is made in FIGS. 6 and 6a, with an explanation to follow.

In the open position as illustrated in FIG. 4, the frame circumscribes a relatively large area and is attached at two points to the tree. The feature of attaching a frame to the sides of the tree, rather than an attachment device that encircles the tree, as in most prior art frames, provides substantial benefit for the user, especially the user of a tree stand that may be several feet off the ground. It is very difficult for a person to stand on a tree stand and reach around the tree to secure the blind. Further, a user can acquire several sets of brackets 14, 16, pre-mount them in his/her favorite hunting sites, then merely carry the frame and curtain from place to place. As will be seen by the ensuing description, once the brackets are in place, the remainder of the assembly is very easy.

Figure 5A:
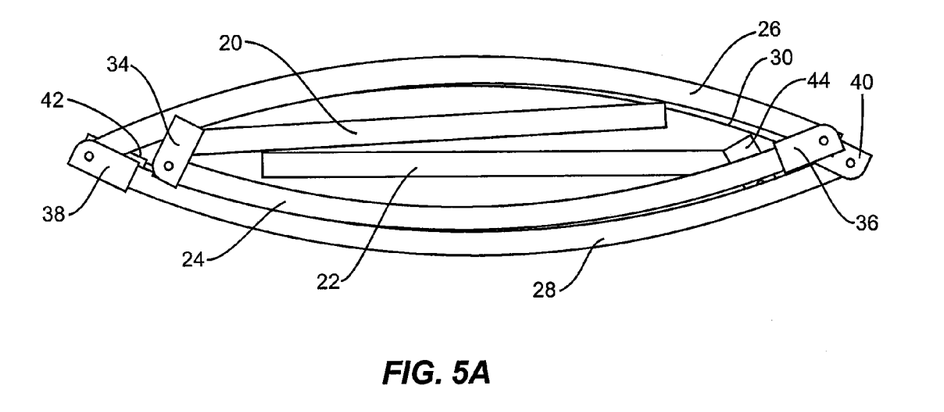
FIG. 5. is a perspective view of the frame in the folded position.
Figure 5B:
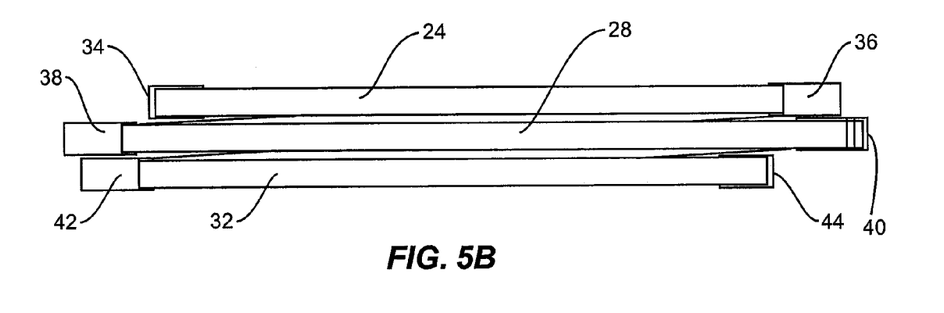

Turning now to FIGS. 5a, 5b, there is illustrated the manner in which the frame can be folded and collapsed. While the frame is sturdy when erected, it is fairly flexible as it is folded. Thus, the frame 12 can be folded into the configuration illustrated in FIGS. 5a, 5b. To facilitate this even further, as each of the hinges 34-44 are welded to its associated arm 24-32, welding techniques can be employed which will provide a slight offset of the hinge with respect to the arm. This will facilitate and enable the folding as illustrated in FIGS. 5a, 5b. For example, first each hinge 34-44 is attached by a rivet 46 to its corresponding arm 24-32. Then the frame pieces are laid out on a pattern in a configuration resembling FIG. 4. Each hinge is then welded on the topside to the appropriate arm. The frame 12 is then folded generally into the configuration illustrated in FIGS. 5A, 5B. Because of the welding on one side only, the frame tends to naturally assume this compact configuration upon folding. Then the hinges are welded to the corresponding arms on the opposite side of the frame 12. Obviously, other techniques may be employed to provide for the compact folding of the frame into the collapsed configuration. It is possible there may be enough natural flexing due to the length and the tolerances in the connecting members.

Figures 6, 6A:
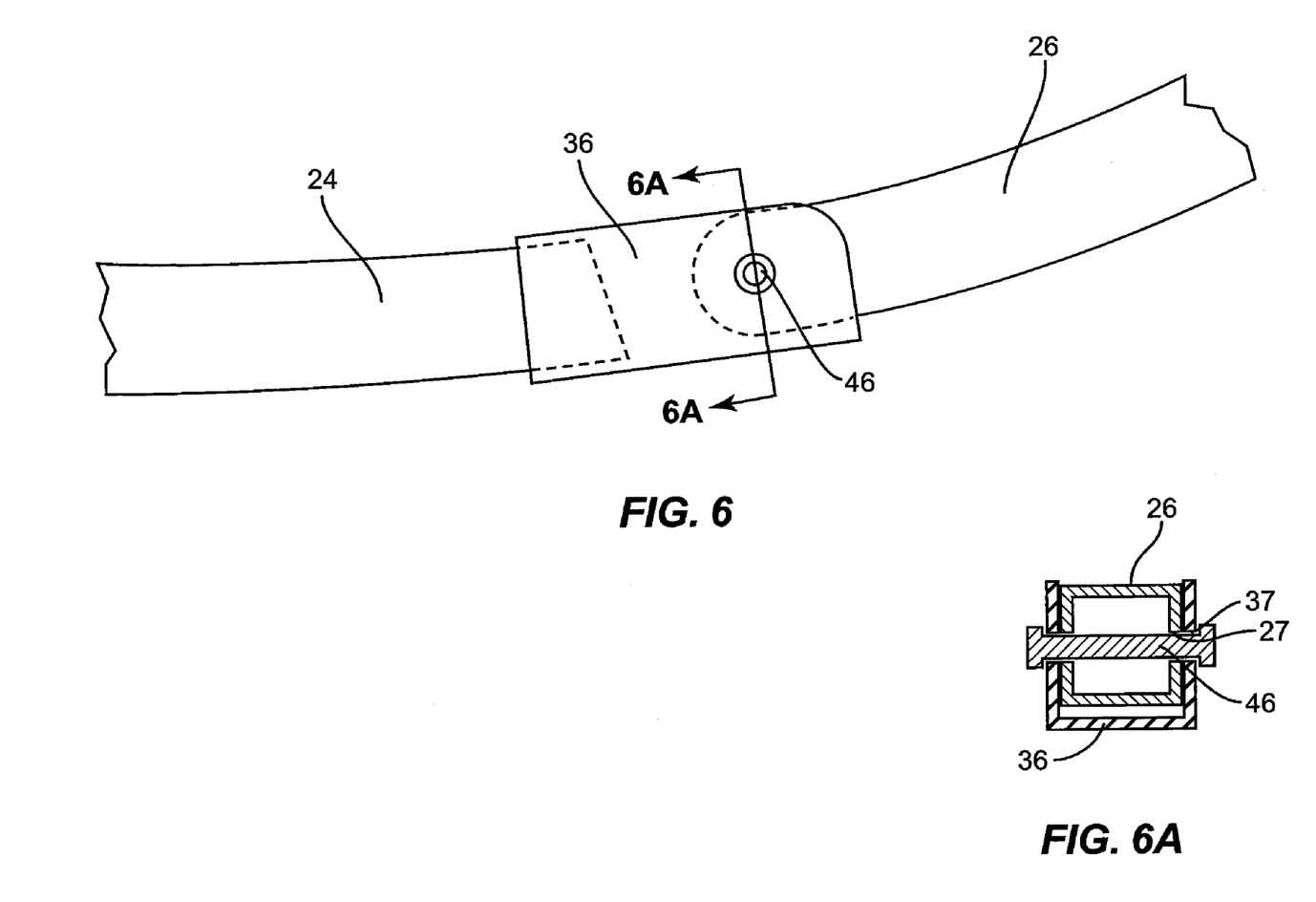
FIG. 6. is a perspective view of one joint of the frame showing the manner in which two of the arms are joined.

In FIG. 6, there is illustrated an exemplary connection between adjacent arms. By way of illustration, in FIG. 6 hinge 36 is utilized to connect arms 24, 26. Arm 26 includes an opening 27 through opposed walls. The hinge also includes openings 37 in opposed walls. A pin 46 is then utilized to hingedly connect arm 26 to hinge 36 as illustrated in FIG. 6a. The hinge 36 is welded to one end of the other arcuate member 24.

Figure 7:
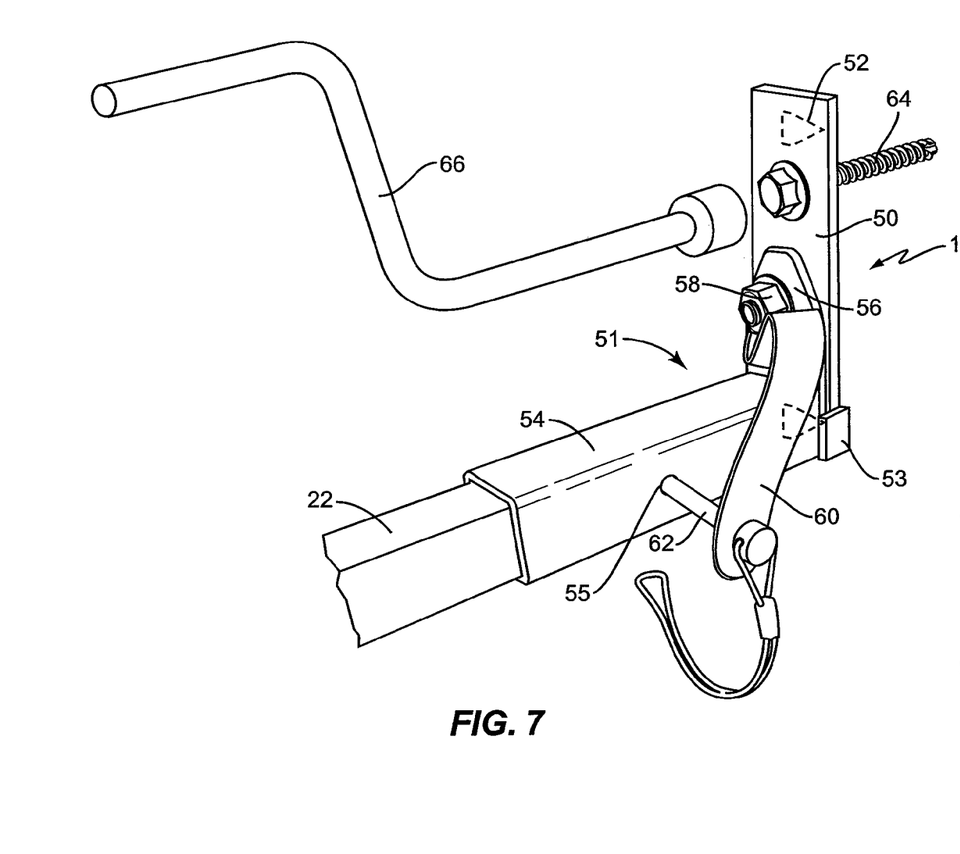
FIGS. 7. and 7a. are front and rear perspective views of one of the mounting brackets.
Figure 7A:
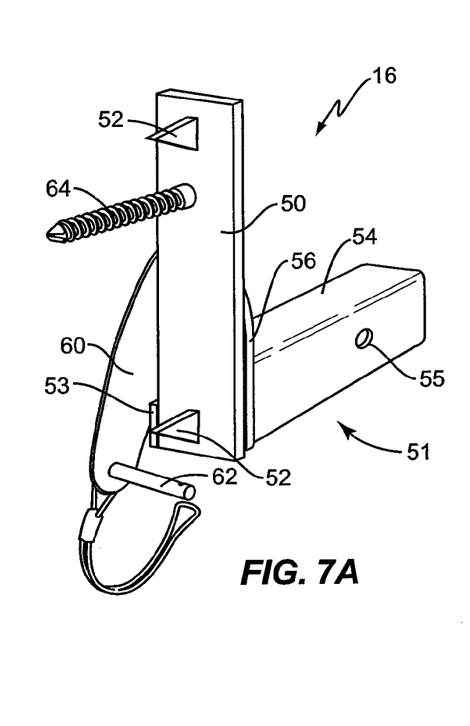
Figure 8:
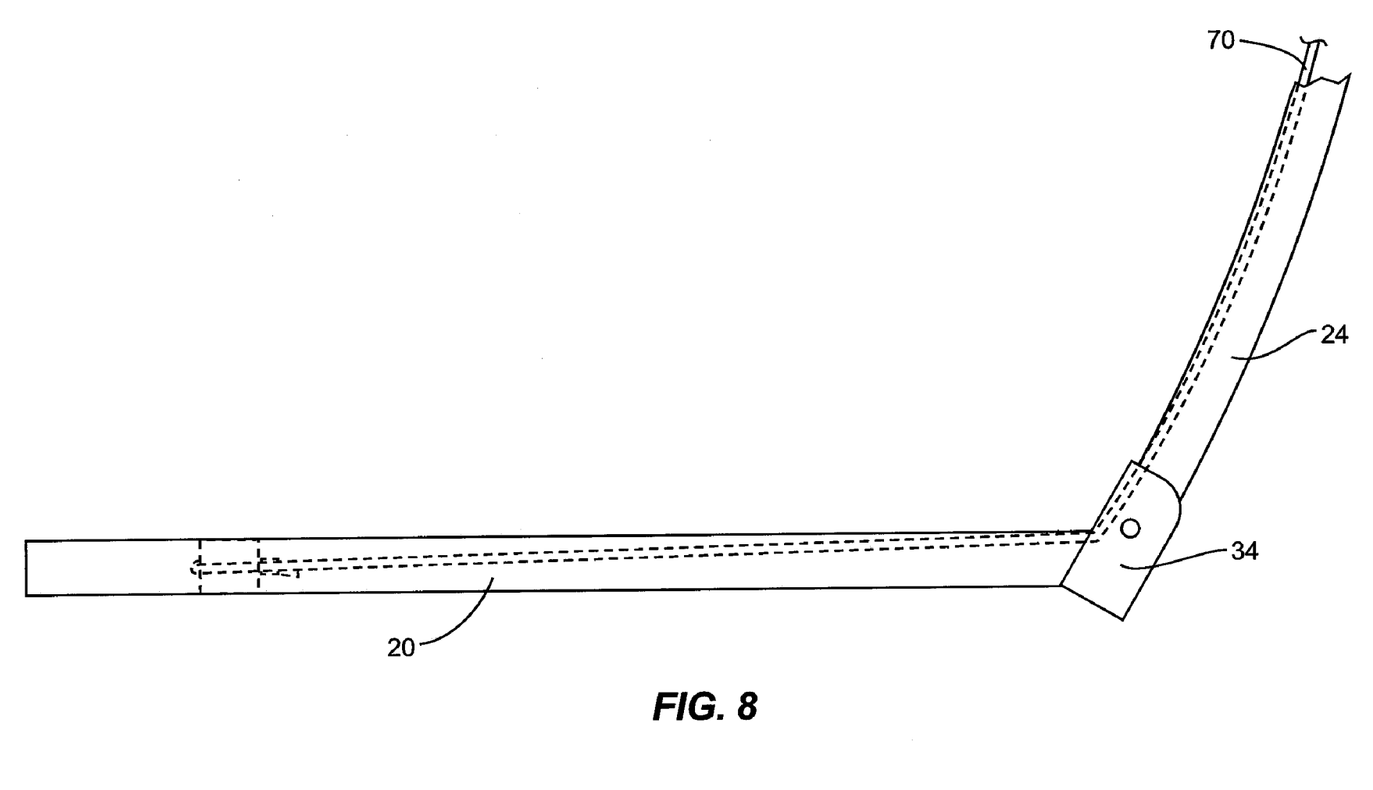
FIG. 8. is a schematic representation of the frame illustrating a reinforcing cable inserted therein.

In FIGS. 7-7a there is illustrated bracket 16, it being understood that bracket 14 is the mirror image of bracket 16, so that when the two brackets 16, 14 are emplaced as illustrated in FIGS. 2, 3, the bracket will allow the swiveling of frame 16 in the manner shown. Bracket 16 is formed basically of a mounting plate 50 which is fixed into the tree trunk and a swiveling frame mounting member 51 which receives the free end of end member 22.

The mounting plate 50 includes a flat plate member having a pair cleats 52 extending rearwardly therefrom and a stop lug 53 welded to the lower rear edge of plate 50. A securing member in the form of a wood screw or spike 64 or the like extends through an opening in the upper portion of plate 50 and is turned or screwed into the tree trunk by a crank handle or wrench 66. In order that no separate tools be required, the crank arm or wrench may be in the form of an extension of 64, i.e. the threads formed on the end of the wrench 66 and pivotally attached to the plate 50, or the wrench 66 may be separate as shown. The cleats 52 stabilize the plate so that it does not swivel.

Plate 50 includes another opening in a lower portion through which bolt and nut assembly 58 extend to attach the connecting foot member 56 of the frame mounting member 51. This connection utilizes washers in such a manner that the connecting foot 56 will swivel with respect to the plate for reasons to be explained hereinafter. A mounting tube 54 extends generally perpendicular from the opposite end of foot 56 and receives the free end of tube 22. Mounting tube 54 includes holes 55 in the opposite walls thereof. Corresponding holes 23 in opposed walls of end member 22 are moved into alignment with holes 55. Then a locking pin 62 extends through all the openings which holds the end member 22 securely in place within the mounting tube 54. Strap 60 merely insures that the locking pin is always available and prevents loss.

As extra insurance, a steel or metal cable 70 may extend through the end members and all arcuate shaped members as illustrated in FIG. 7 to further reinforce the frame.

In order to erect the hunting blind, the user first installs the brackets 14, 16 to generally opposed sides of a suitable tree. A deer stand or hunting stand may already be in place on the tree trunk, and therefore the bracket should be installed a suitable height above the hunting stand. Alternatively, the brackets may be attached several feet above the ground, so that the blind may be used by a hunter or person on the ground. Also, the blind may be used by campers or others than hunters as explained hereinabove. For example, the blind could surround a portable toilet.

In any event, once the brackets are installed, it is very simple to unfold the frame, place the end members 20, 22 in the corresponding brackets 14, 16, and insert the locking pins 62. Obviously, the curtain should have been installed onto the frame prior to this operation.

When it is desired to use the hunting blind in a different location, assuming brackets have been preinstalled, the procedure above is merely reversed, and the frame taken to another set of brackets and installed as simply as described above.

It should be realized that the embodiment described above is merely exemplary of one embodiment of the present invention. Obviously, some changes can be made and some of the aspects above are optional. For example, there are many ways in which the arms and end members may be hingedly connected together. There are other configurations for the mounting bracket which would appropriately mount the frame. The illustrated brackets enable the mounting frame to be swiveled up and out of the way to facilitate the moving into and out of position, however, this is an optional feature. Obviously, the mounting brackets could be simplified if this feature were not to be incorporated. Further, as stated above, the reinforcing cable is also optional. While the arm members are rectangular, tubular steel members, they could be of different shape and made out of different materials.

Other modifications may occur to those skilled in the art, and the invention should not be limited to the extent of the details herein, but should extend to the full scope and spirit as defined by the following claims.

What is claimed is:

1. A portable hunting blind attachable to a tree trunk comprising:
   (a) a pair of brackets, each bracket including a mounting plate and at least one threaded securing member extending through the mounting plate for affixing the pair of brackets at spaced circumferential positions to the trunk of a tree, each bracket also including a mounting tube extending in a direction generally outwardly from the mounting plate, whereby the mounting tube extends in a direction generally radially outwardly from the tree trunk when the mounting plate is affixed thereto;
   (b) a collapsible, articulated, arcuate shaped suspension frame including a plurality of arms and an end member at each end, each end member having a free end so configured with a cross-sectional shape that it slides into connectable engagement with the mounting tube, the arms and end member being pivotally connected in such a manner that;

(i) when unfolded one end member is slideably connected to the mounting tube of one of the brackets and the other end member is slideably connected to the mounting tube of the other of the brackets with the suspension frame extending arcuately therebetween;

(ii) when folded the arms and end members articulate continuously from one end to the other, the folded frame being compact; and (c) a fabric curtain suspended from the suspension frame.

2. The blind according to claim 1 in which the arms are arcuately shaped on substantially the same radius, each arm being hingedly attached to the adjacent arm or end member.

3. The portable hunting blind according to claim 2 wherein the arms and end members of the suspension frame are connected by hinges, each hinge being offset with respect to the corresponding arm or end member whereby the arms and end members may be folded into a compact configuration for movement from one place to another.

4. The blind according to claim 1 wherein a cable extends through the arms and end members and is attached adjacent the free end of each end member to provide additional reinforcement.

5. The blind according to claim 1 wherein the end members are tubular, substantially straight, and include a pair of aligned holes adjacent the free end which accepts a locking pin which extends through the end member and the mounting tube.

6. The blind according to claim 1 in which each bracket comprises a substantially flat mounting plate with a front surface and a rear surface and an opening in the upper portion for receiving the threaded securing member, the mounting tube extending away from the lower portion of the front surface, and the threaded securing member being attached to the mounting plate in such a manner as to allow rotation thereof to cause the threaded securing member to bite into the tree trunk as the bracket is affixed.

7. The blind according to claim 6 in which each bracket further includes at least one cleat extending from the rear surface of the mounting plate to stabilize the bracket when affixed.

8. The blind according to claim 6 wherein the threaded securing member is a crank arm having threads on one end and extending through the opening and pivotally attached to the mounting plate.

9. The blind according to claim 6 in which each bracket includes a foot member pivotally connected to the mounting plate, the mounting tube being connected to the foot member, whereby the suspension frame may be lifted after assembly to allow easier access to the user.

* * * * *